United States Patent [19]

Tsuge et al.

[11] 4,358,136
[45] Nov. 9, 1982

[54] ENERGY ABSORBING DEVICE FOR USE WITH VEHICULAR SEAT BELT

[75] Inventors: Noboru Tsuge, Kariya; Satosi Kuwakado; Toshiaki Shimogawa, both of Aichi; Toshihiro Takei, Kariya, all of Japan

[73] Assignee: Nippon Soken, Inc., Nishio, Japan

[21] Appl. No.: 211,295

[22] Filed: Nov. 28, 1980

[30] Foreign Application Priority Data

Nov. 30, 1979 [JP] Japan .................. 54-166251[U]

[51] Int. Cl.³ ............................................. B60R 21/10
[52] U.S. Cl. .................................. 280/806; 188/371; 188/93; 280/805; 297/472; 297/480
[58] Field of Search ............ 280/803, 804, 805, 806, 280/807; 60/632, 637, 638; 188/1 C; 180/268; 297/472, 480

[56] References Cited

U.S. PATENT DOCUMENTS

| | | | |
|---|---|---|---|
| 3,547,468 | 12/1979 | Giuffrida | 280/806 |
| 3,561,690 | 2/1971 | Muskat | 280/806 |
| 4,027,905 | 6/1977 | Shimogawa et al. | 280/806 |
| 4,232,886 | 11/1980 | Tsuge et al. | 280/806 |
| 4,237,690 | 12/1980 | Tsuge et al. | 280/806 |
| 4,258,934 | 3/1981 | Tsuge et al. | 280/806 |
| 4,288,098 | 9/1981 | Tsuge et al. | 280/806 |

Primary Examiner—Richard A. Bertsch
Attorney, Agent, or Firm—Cushman, Darby & Cushman

[57] ABSTRACT

An energy absorbing device for use with a vehicular seat belt includes a housing adapted to be secured to the vehicle and defines a circular interior space and a narrow passage extending between the interior space and the outer surface of the housing. An elongated rod-like strip of a metal has a coiled end portion having a plurality of turns disposed in the circular space. An intermediate portion of the metal strip extends from the interior space outwardly through the narrow passage and terminates in the other end which is adapted to be connected to the seat belt. The junction between the circular space and the narrow passage is shaped to bend successive portions of the metal strip and guide them into the narrow passage when a tension of a magnitude greater than the bending stress of the metal strip is applied to the outer end of the strip during a collision.

7 Claims, 3 Drawing Figures

ENERGY ABSORBING DEVICE FOR USE WITH VEHICULAR SEAT BELT

RELATED CASES

This application is related to the Tsuge et al. application Ser. No. 174,177 filed July 31, 1980 and to the U.S. patents of Tsuge et al. U.S. Pat. No. 4,232,886 granted Nov. 11, 1980, U.S. Pat. No. 4,237,690 granted Dec. 9, 1980, U.S. Pat. No. 4,258,934 granted Mar. 31, 1981, and U.S. Pat. No. 4,288,098 granted Sept. 8, 1981.

BACKGROUND OF THE INVENTION

1. Field of the Invention

The present invention relates to an energy absorbing device for use with a seat belt system of a vehicle, such as an automobile, to absorb the kinetic energy of a passenger during a collision of the vehicle so as to prevent the passenger from being injured.

2. Description of the Prior Art

As a means for absorbing the kinetic energy of a passenger during a collision of a vehicle, an energy absorbing device for use with a vehicular seat belt system has been known which utilizes an elongated member of a metal connected to the seat belt so that the metal member is plastically deformed by the tension produced in the seat belt by a shock load caused by the collision thereby to absorb the kinetic energy of the passenger.

More specifically, one type of the known energy absorbing devices has a casing having a pair of parallel faces and a folded web of a metal associated with the casing such that the folded part of the metal web extends between the two faces of the casing with one end of the web secured to the casing and the other end extending therefrom. On collision, there is produced a relative movement between the casing and the metal web so that the folded part of the web is subjected to plastic deformation. Another type of the energy absorbing devices of the prior art comprises a corrugated sheet metal having one end secured to a part of the vehicle and the other end connected to an end of a seat belt so that the corrugated sheet metal is plastically deformed and elongated by an energy produced during a collision of the vehicle.

The folded metal web and the corrugated sheet metal employed in the prior art energy absorbing devices are large-sized and are difficult to install within a limited space in a vehicle. In addition, the large-sized members will lead to the increase in the weight of the vehicle and thus are undesirable from the view points of saving material and also minimizing the fuel consumption of the vehicle.

SUMMARY OF THE INVENTION

It is an object of the present invention to provide an energy absorbing device for use with a vehicular seat belt which is free from the difficulty and disadvantage of the prior art discussed above and which is compact in design and still provides a highly reliable operation to protect a passenger from injury during an abrupt deceleration of an associated vehicle, such as a collision.

The energy absorbing device for use with a seat belt of a vehicle according to the present invention comprises a housing adapted to be secured to the vehicle and defining an interior space and a narrow passage extending between said interior space and the outer surface of said housing, an elongated rod-like strip of a metal including an outer end portion extending from said housing and adapted to be connected to the seat belt, a coiled portion adjacent to the other end of said strip and having a plurality of axially arranged turns disposed in said interior space and an intermediate portion interconnecting said coiled portion and said outer end portion and extending from said interior space outwardly through said narrow passage, strip bending and guiding means disposed between said interior space and said narrow passage, the arrangement being such that normally said intermediate portion of said metal strip extends in engagement with said strip bending and guiding means and, when a tension of a magnitude greater than a predetermined level is exerted to the outer end of said metal strip, successive parts of the coiled portion of said wire are bent over and drawn along said strip bending means, and means for preventing the axis of said coiled portion of said wire from being displaced when the tension is applied to the wire.

As compared with the prior art energy absorbing devices, the device according to the present invention is advantageously compact in design because of the use of an elongated rod-like strip of a metal, such as wire. The coiled portion of the metal strip has a plurality of axially arranged turns disposed in the interior space of the housing while the intermediate portion of the metal strip interconnects the coiled portion thereof and the outer end portion of the metal strip and is bent over the strip bending and guiding means and extends in engagement therewith. Thus, when a tension greater than a predetermined magnitude is produced in the seat belt during a collision, the metal strip is pulled outwardly out of the casing so that successive parts of the coiled portion of the metal strip are pulled over the strip bending and guiding means and through the narrow passage and thus are subjected to plastic deformation. Because the coiled portion of the elongated metal strip has a plurality of axially arranged turns disposed coaxially in the interior space of the housing and because the strip bending and guiding means is disposed in the housing at the junction between the interior space and the narrow passage, the energy absorbing device of the invention profides an additional advantage that the radius of curvature of the metal strip is not varied and, accordingly, the bending stress of the metal strip remains substantially constant.

The above and other objects, features and advantages of the present invention will be made apparent by the following description with reference to the accompanying drawings.

DESCRIPTION OF PREFERRED EMBODIMENTS

Figure 1:
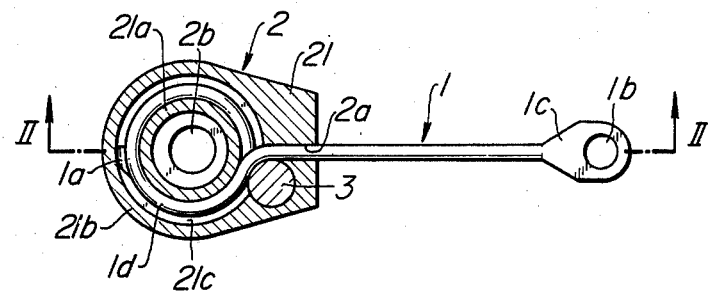
FIG. 1 is a partly sectional view of an embodiment of the energy absorbing device according to the present invention.
Figure 2:
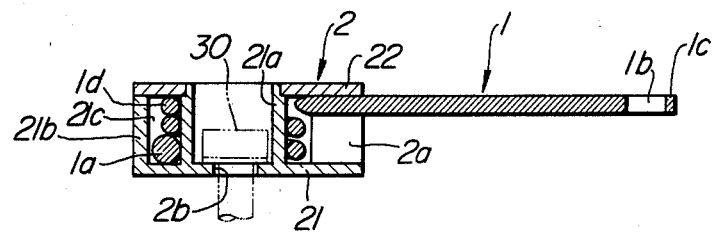
FIG. 2 is a section taken substantially along line II—II in FIG. 1.

Referring now to FIGS. 1 and 2 of the drawings, an embodiment of the energy absorbing device of the present invention comprises an elongated strip 1 of a metal and a housing 2 which includes a body portion 21 and a cover 22. The body portion 21 has an annular inner portion 21a and an outer portion 21b radially outwardly spaced therefrom. The outer portion 21b has a radially inwardly directed substantially cylindrical inner peripheral surface which cooperates with a radially outwardly directed substantially cylindrical outer peripheral surface of the inner portion 21a to define an annular interior space 21c. A narrow passage 2a is formed in the body portion 21 of the housing 2 and is open to the annular space 21c so that the axis of the passage 2a is substantially radial to the axis of the annular interior space 21c. The housing body portion 21 is also provided with a central through-hole 2b which is coaxial with the annular space 21c and through which a fastener such as a bolt 30 can extend into a threaded hole in a stationary part of a vehicle to secure the body portion 21 thereto.

A pin 3 is mounted in the body portion 21 of the housing 2 substantially coaxially with the annular space 21c such that a part of the peripheral surface of the pin 3 is positioned at the junction between the space 21c and the passage 2a. In the illustrated embodiment of the invention, the pin 3 is fixed to the body portion 21 of the housing 2. However, this is not essential for the invention and the pin 3 may be rotatably mounted on the body portion 21.

The metal strip 1 is in the form of a length of wire having an inner end 1a of a diameter greater than that of the rest of the wire 1 and also greater than the width of the narrow passage 2a. The part of the wire 1 adjacent to the larger-diameter inner end 1a is formed into a coil 1d having a plurality of axially arranged turns all received in the annular interior space 21c of the housing 2. An intermediate portion of the wire 1 interconnects the coiled portion 1d and an outer end portion 1c of the wire and extends from the annular space 21c and outwardly through the narrow passage 2a. It will be appreciated that, because the passage 2a is substantially radial to the annular space 21c and because a part of the peripheral surface of the pin 3 is disposed at the junction between the annular space 21c and the narrow passage 2a, the intermediate portion of the wire 1 is bent over the cylindrical surface of the pin 3 extending between the inner peripheral surface of the outer portion 21b of the housing and one of the side faces of the narrow passage 2a. The wire end portion 1c is provided with a hole 1b for connection to a seat belt.

After the coiled portion 1d of the wire 1 has been placed in the annular space 21c with the intermediate portion of the wire extending through the narrow passage 2a, the cover 22 is fixed to the body portion 21 of the housing 2 by any conventional means, such as welding, to close the annular space 21c.

In operation, when a kinetic energy is applied to the seat belt during a collision of an associated vehicle, the wire 1 tends to be pulled out of the housing 2. When the kinetic energy reaches a magnitude as large as the bending stress of the wire 1 at the cylindrical surface of the pin 3, successive parts of the coiled portion 1d of the wire 1 are bent over the pin 3 and are pulled out of the annular interior space 21c of the housing 2 over the cylindrical surface of the pin 3 and outwardly through the narrow passage 2a therein. The successive parts of the wire 1 are plastically deformed when the wire is pulled or drawn out of the housing 2 to thereby absorb the kinetic energy of the passenger. The radius of curvature of the bend of the wire 1 is determined by the surface of the pin 3, the narrow passage 2a and the outer peripheral surface of the inner portion 21a of the body portion 21 of the housing 2. Thus, the bending stress of the wire is not varied but kept substantially constant. This assures that the kinetic energy of the passenger produced during a collision can reliably be absorbed by the plastic deformation of the wire 1. The cylindrical surface of the pin 3 is utilized to guide the wire 1 when it is pulled out of the space 21c and bent or plastically deformed. Thus, this surface of the pin may be termed as "wire bending and guiding means". The outer peripheral surface of the inner portion 21a acts as means for centering the turns of the coiled portion 1d relative to the annular space 21c.

The inner end extremity of the coiled wire 1 has a diameter greater than the dimension or width of the narrow passage 2a and thus cannot be pulled out of the housing 2. This ensures that the passenger can be prevented from being completely unrestrained.

Figure 3:
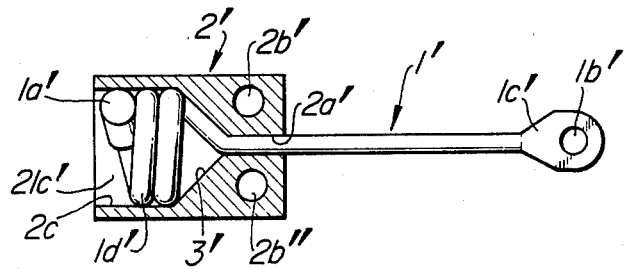
FIG. 3 is a partly sectional view of another embodiment of the energy absorbing device of the invention.

A second embodiment of the energy absorbing device of the present invention will be described with reference to FIG. 3. The embodiment comprises an elongated strip of a metal in the form of wire 1' and a housing 2'. The wire 1' is similar to the wire 1 of the first embodiment with the exception that an intermediate portion of the wire 1' is substantially coaxial with axially arranged turns of a coiled portion 1d' of the wire 1'. The portions of the wire 1' similar to those of the wire 1 of the first embodiment are designated by similar reference numerals with a prime (') added.

The housing 2' has a radially inwardly directed substantially cylindrical inner peripheral surface portion 2c and a substantially conical inner surface portion 2' connected to one end of the cylindrical surface portion to cooperate therewith to define an interior space 21c'. A narrow passage 2a' is formed in the housing 2' and open to the conical inner surface portion 3' substantially in coaxial relationship thereto. Thus, the passage 2a' is positioned at the apex of the conical inner surface portion 3'. The housing is also provided with a pair of through-holes 2b'' through which fasteners, such as screws (not shown), may extend to secure the housing to a vehicle.

The wire 1' and the housing 2' are assembled such that the coiled portion 1d' of the wire 1' is disposed in the cylindrical section of the interior space 21c' and substantially coaxial therewith and such that the intermediate portion of the wire 1' is bent relative to the innermost turn of the coiled portion 1d' of the wire and extends along the conical inner surface portion 3' and outwardly through the narrow passage 2a'.

The second embodiment of the energy absorbing device according to the present invention provides an operation similar to the operation of the first embodiment described with reference to FIGS. 1 and 2. The conical inner surface portion 3' of the interior space 21c' acts as a "wire bending and guiding means"; Namely, when the tension applied to the wire 1' reaches a magnitude as large as the bending stress of the wire 1' at the juction between the coiled portion 1d' and the intermediate portion of the wire 1', successive parts of the coiled portion 1d' of the wire 1' are plastically deformed and pulled along the conical inner surface portion 3' and outwardly through the narrow passage 2a', so that the kinetic energy of the passenger is absorbed.

The "wire bending and guiding means" 3' of the second embodiment is integral with the housing 2'. However, it will be obvious to those in the art that the wire bending and guiding means 3' may be formed by a member which is not integral with the housing 2'. It will also be apparent to those in the art that, in the case where the wire bending and guiding means 3 and 3' of the first and second embodiments of the invention are formed by members which are not integral with the housings 2 and 2', respectively, such members may be mounted on the housings so that they are rotated relative to the housings when the wires are drawn out of the housings. Moreover, it is not essential for the housings 2 and 2' to have annular or cylindrical interior space. The only requirement for the housings is that they are provided with means for preventing the axis of the coiled portion of the wire from being displaced or offset when a tension is exerted to the wire.

What is claimed is:

1. An energy absorbing device for use with a seat belt of a vehicle, comprising a housing adapted to be secured to the vehicle and defining an interior space and a narrow passage extending between said interior space and the outer surface of said housing, an elongated rod-like strip of a metal including an outer end portion extending from said housing and adapted to be connected to the seat belt, a coiled portion adjacent to the other end of said strip and having a plurality of axially arranged turns disposed in said interior space and an intermediate portion interconnecting said coiled portion and said outer end portion and extending from said interior space outwardly through said narrow passage, strip bending and guiding means disposed between said interior space and said narrow passage, the arrangement being such that normally said intermediate portion of said metal strip extends in engagement with said strip bending and guiding means and, when a tension of a magnitude greater than a predetermined level is exerted to the outer end of said metal strip, successive parts of the coiled portion of said wire are bent over and drawn along said strip bending and guiding means, and means for preventing the axis of said coiled portion of said wire from being displaced when the tension is applied to the wire.

2. An energy absorbing device as defined in claim 1, wherein said interior space is substantially annular, said narrow passage is open to said annular space such that the axis of said passage is substantially radial to the axis of said annular space and said strip bending and guiding means comprises a substantially cylindrical surface disposed at the junction between said annular space and said narrow passage, said intermediate portion of said metal strip extending around said cylindrical surface.

3. An energy absorbing device as defined in claim 2, wherein said strip bending and guiding means comprises a pin member mounted in said housing adjacent to said junction between said annular space and said narrow passage such that the axis of said pin member is substantially parallel to the axis of said annular space, and wherein said cylindrical surface is a part of the peripheral surface of said pin member.

4. An energy absorbing device as defined in claim 2 or 3, wherein said housing includes an outer portion having a radially inwardly directed substantially cylindrical inner peripheral surface and an inner portion having a radially outwardly directed substantially cylindrical outer peripheral surface cooperating with said inner peripheral surface to define said annular space, and cover member closing said annular space.

5. An energy absorbing device as defined in claim 4, wherein the other end of said strip is disposed adjacent to said coiled portion and has a diameter greater than that of the rest of said metal strip and also greater than the width of said narrow passage.

6. An energy absorbing device as defined in claim 1, wherein said housing has a radially inwardly directed substantially cylindrical inner peripheral surface portion and a substantially conical inner surface portion connected to one end of said cylindrical inner peripheral surface portion, said cylindrical and conical surface portions defining therein said interior space, said narrow passage being open in said conical surface portion and substantially coaxial therewith, the arrangement being such that said coiled portion of said metal strip is disposed in the cylindrical section of said interior space and said intermediate portion of said strip extends along said conical inner surface and through said narrow passage.

7. An energy absorbing device as defined in claim 6, wherein the other end of said strip is disposed adjacent to said coiled portion and has a diameter greater than that of the rest of said metal strip and also greater than the inner diameter of said narrow passage.

* * * * *